United States Patent [19]

Barnhill et al.

[11] Patent Number: 5,524,685
[45] Date of Patent: Jun. 11, 1996

[54] DEBARKING/DELIMBING APPARATUS

[75] Inventors: Dennis K. Barnhill, Truro; Kevin J. Sibley, Great Village, both of Canada

[73] Assignee: Barnhill Equipment Ltd., Nova Scotia

[21] Appl. No.: 517,829

[22] Filed: Aug. 22, 1995

Related U.S. Application Data

[63] Continuation-in-part of Ser. No. 385,820, Feb. 9, 1995, abandoned.

[51] Int. Cl.$^6$ ..................................... B27L 1/00
[52] U.S. Cl. ................ 144/208.1; 144/341; 144/343; 144/24.13; 144/208.7; 241/294
[58] Field of Search ................... 241/191, 194, 241/294; 144/2 Z, 208 R, 208 J, 340, 341, 343

[56] References Cited

U.S. PATENT DOCUMENTS

| | | | |
|---|---|---|---|
| 632,979 | 9/1899 | Wolfe | 144/208 |
| 2,588,903 | 3/1952 | Akins | 144/208 |
| 2,769,468 | 11/1956 | Swanson | 144/208 |
| 2,917,090 | 12/1959 | Streed | 144/208 |
| 2,985,206 | 5/1961 | Letts | 144/208 |
| 3,088,504 | 5/1963 | Stihl et al. | 144/208 |
| 4,368,764 | 1/1983 | Peterson et al. | 144/208 J |
| 4,721,139 | 1/1988 | Peterson et al. | 144/208 J |
| 4,875,511 | 10/1989 | Wingate-Hill et al. | 144/208 R |
| 5,094,281 | 3/1992 | Barnhill et al. | |
| 5,097,880 | 3/1992 | Pousette | 144/208 B |
| 5,111,860 | 5/1992 | Wingate-Hill et al. | 144/208 F |
| 5,247,977 | 9/1993 | Munsey et al. | 144/341 |

FOREIGN PATENT DOCUMENTS

| | | | |
|---|---|---|---|
| 729954 | 3/1966 | Canada | 144/208 |
| 2060096 | 7/1992 | Canada | B27L 1/10 |

*Primary Examiner*—W. Donald Bray
*Attorney, Agent, or Firm*—Jones, Tullar & Cooper

[57] ABSTRACT

Debarking/delimbing apparatus, especially for softwood, comprises at least one spool device mountable so as to be rotatably driven about an axis and capable of removing bark from tree parts moved lengthwise relative to said device across its axis, with each spool device comprising a rotor carrying one or more pairs of elongated debarking elements each having debarking teeth. At least in operation of the apparatus, each of the debarking elements is in the form of a helix or near helix expanding from a minimum diameter at a central region of the rotor to a maximum diameter away from the central region, these elements protruding from the rotor so that, in most angular positions of the rotor, a tree part is cradled between two debarking elements and contacts the spool only on one area of each debarking element of a pair. The debarking elements may be in fixed helical form, or may be flexibly mounted and capable of assuming a near helical form.

23 Claims, 7 Drawing Sheets

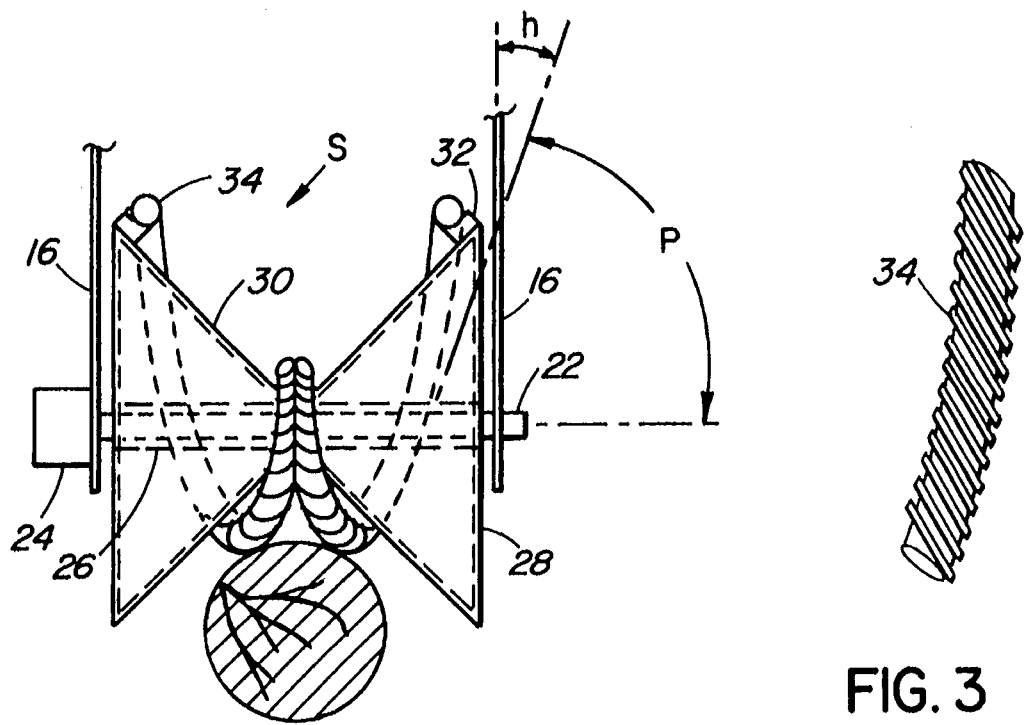
FIG. 2
FIG. 3
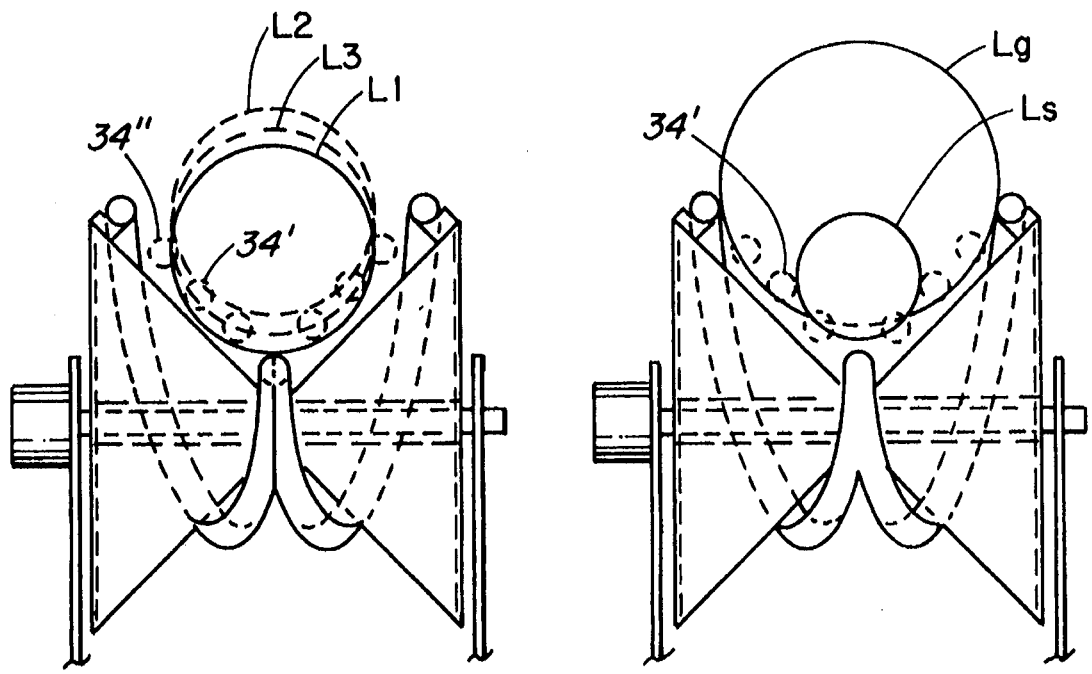
FIG. 4a
FIG. 4b

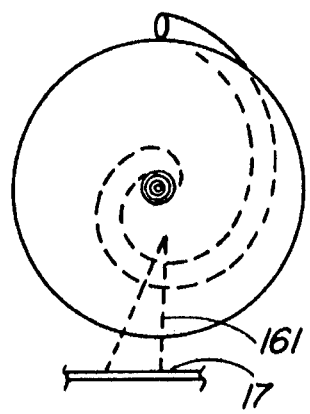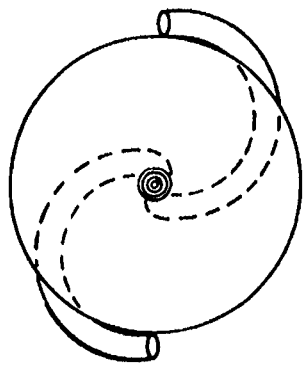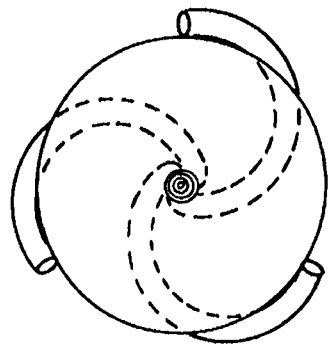
FIG. 5a  FIG. 5b  FIG. 5c
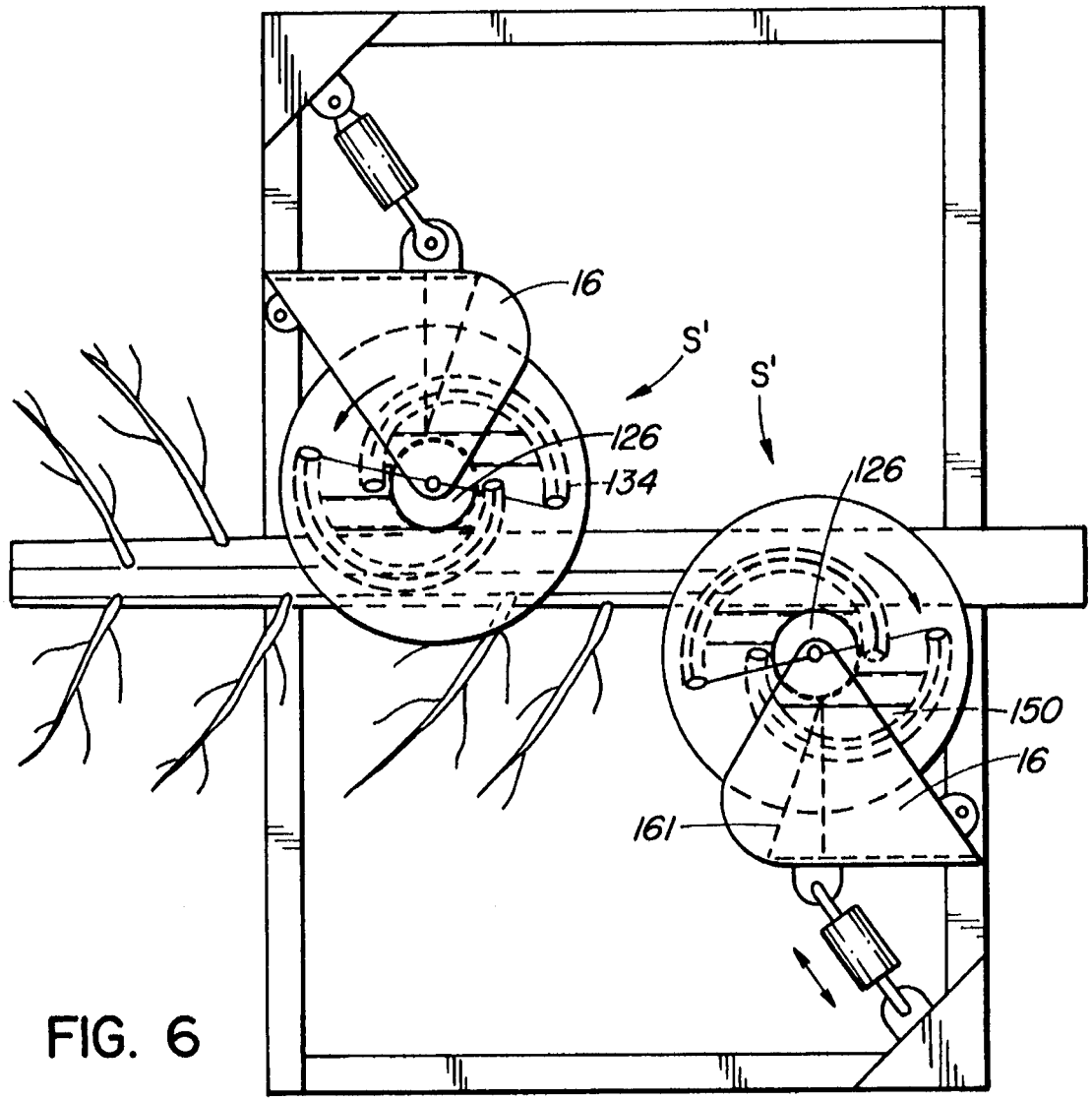
FIG. 6

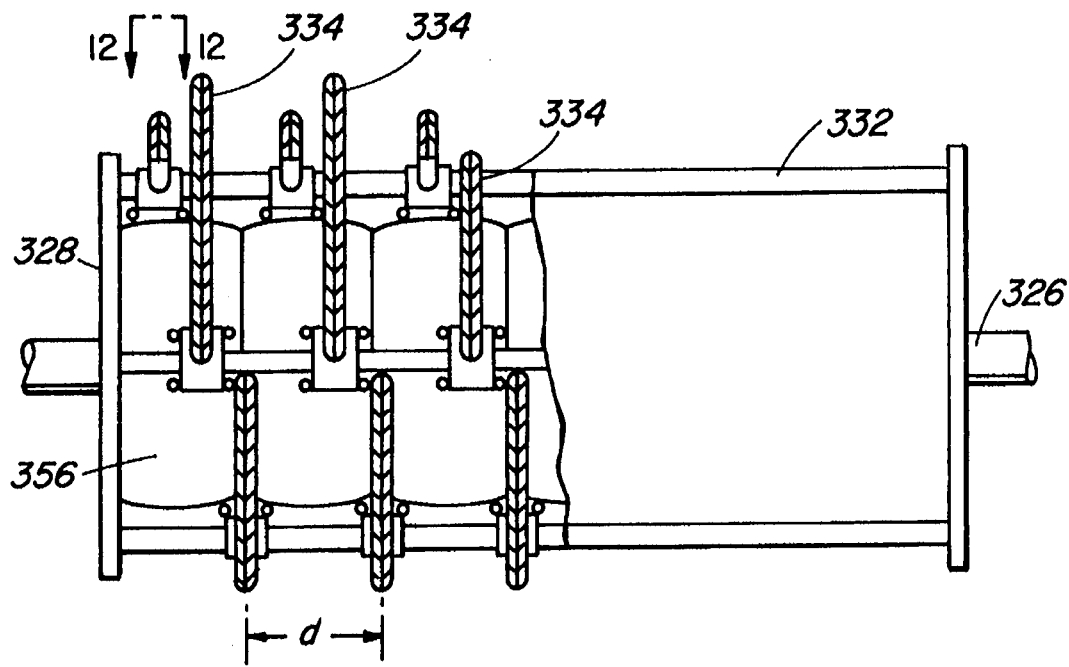
FIG. 11
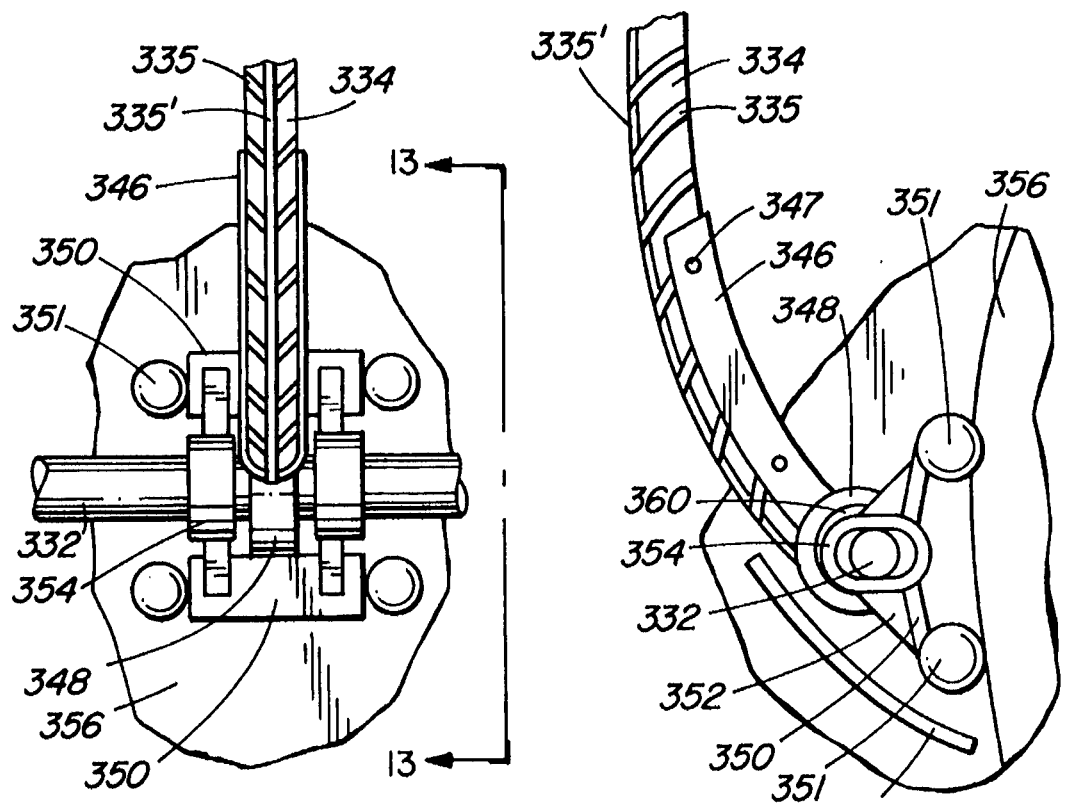
FIG. 12
FIG. 13

DEBARKING/DELIMBING APPARATUS

CROSS REFERENCES TO RELATED APPLICATIONS

This application is a continuation-in-part of U.S. patent application Ser. No. 08/385,820, filed Feb. 9, 1995, now abandoned.

BACKGROUND OF THE INVENTION

1. Field of the Invention

The present invention provides apparatus capable of removing both bark and limbs from trees or tree parts. However, since the apparatus may be used only for removing bark, or only for removing limbs, references to "debarking/delimbing" apparatus and the like will be understood to include apparatus suitable only for debarking or only for delimbing.

While apparatus of this invention may have many different applications, a particular utility is in debarking and delimbing small trees, especially softwood trees, from about 1 inches to about 12 inches diameter, of the type used to produce pulp for paper making. For the production of good quality paper, it is required that about 99% of the bark be removed. However, this invention can also be used to debark trees of up to 24 inches diameter, e.g. for the production of lumber.

2. Prior Art

Various rather complex and expensive debarkers have been designed and made for removing bark from trees in pulp mills. Simpler mobile debarkers have also been used in the forest. The trend in recent years has been to conduct debarking and delimbing in the forest, so that the biodegradable waste products can immediately be returned to the forest floor.

One known kind of debarker is the so-called ring debarker, in which a ring, rotatable on its own axis, carries a series of arms which are pivotally mounted inside the ring and carry debarking tools which remove the bark from a tree fed through the ring. This has the drawback of being complex and expensive.

Another kind of debarker, and one which is mobile enough to be used in the forest, is the so-called flail debarker. This has one or two rotatable spools each with a series of chains which extend outwards from the spool when the spool is rotated at high speed. While these are commonly used, they have drawbacks. Firstly, they do not reliably remove all or almost all the bark. Secondly, breakage of the chains is common. Chain breakage not only adds to maintenance cost, but means that precautions have to be taken to prevent pieces of broken chain from entering processing equipment which receives the debarked wood. Also, metal fragments may make the waste products of the process unsuitable as fuel.

The present invention provides a spool device which is capable of removing bark from most of one side of a tree part, but which does not use loose members such as chains which are subject to breakage. Debarking apparatus using two of the spool devices of this invention is capable of removing most of the bark of tree parts fed between the spools, for example about 99% of the bark. The term "tree part" includes tree trunks and tree branches of more than 1 inch diameter.

Spool devices having movable debarking elements, intended as an improvement over chain flails, are described in prior U.S. Pat. No. 5,094,281, issued Mar. 10, 1992, and Canadian Patent Application No. 2,060,096, published Jul. 26, 1992, of which I am co-inventor.

Spool devices in the form of rollers having fixed debarking elements are known from the following patents:

U.S. Pat. No. 2,917,090, issued Dec. 15, 1959 to Streed;
U.S. Pat. No. 3,088,504, issued May 7, 1963 to Stihl et al.;
U.S. Pat. No. 4,875,511, issued Oct. 24, 1989 to Wingate-Hill et al.;
U.S. Pat. No. 5,111,860, issued May 12, 1992 to Wingate-Hill et al.;
U.S. Pat. No. 5,247,977, issued Sep. 28, 1993 to Munsey et al.; and
Canadian Patent No. 729,954, issued Mar. 15, 1996 to Letts.

To Applicant's knowledge, none of these devices is in widespread use. A perceived drawback of these designs is that each spool or roller contacts only much less than 180° of the circumference of a log, even with diameters of log for which they are designed, and the efficiency of the bark removal will usually fall significantly as the size of the log is reduced. Adequate debarking with such apparatus seems to require at least three rollers, and usually more, and is therefore complex and expensive. Accordingly, these devices do not offer an acceptable alternative to chain flail debarkers in which each spool can debark almost 180° of the circumference of logs having a wide variety of sizes.

Thus, the Streed patent has three rollers or spools of different configurations which all act on one side of a log, but all these rollers would not contact more than about 140° of the one side.

The Stihl et al. patent shows double cone rollers capable of contacting only a minor part of the circumference of a tree trunk, probably much less than 90°.

The Wingate-Hill '511 patent shows apparatus having three or more pairs of concave rollers, each of which seems to be capable of contacting about 100° or 110° of the circumference of logs which fit the concavity of the rollers; for smaller logs the contact surface would be much less. The '860 patent suggests that three of its double-cone rollers oriented at 120° to each other may be sufficient for debarking logs; however debarking seems to rely on a substantial pressure being applied to the logs; since the double-cone rollers have a shallow angle each itself could hardly contact more than about one-quarter of a log circumference.

The Munsey et al. patent suggests the use of four concave rollers, each debarking somewhat more than one quadrant of a log. Here a complex mounting arrangement is provided for the rollers so that when used on logs of small diameter the axes of the rollers are twisted relative to each other to allow them to nest without interference. This suggests that the process relies on pressure, as in the Wingate-Hill patents, since otherwise the rollers could be spaced along the logs. In systems which rely on pressure, the need for rollers to be overlying or close to each other along the logs limits the maximum diameter of the rollers, and thus the amount that the sides of a roller can overlap and debark the sides of a log.

Another perceived drawback of these systems, particularly those of Wingate-Hill, is that processes which rely on pressure for removing bark are believed to only be suitable for certain types of wood, harvested at a time when they have adequate sap. Such processes are believed unsuited to North American softwoods which are frequently harvested in the winter months.

Canadian Patent No. 729,954 describes a spool device intended to replace chain flails. This has a parallel sided roller which would only contact a small proportion of one side of a log.

Relevant prior art also includes spool devices having flexible debarking elements, such as U.S. Pat. Nos. 2,769,468, issued Nov. 6, 1956 to Swanson, and 4,368,764, issued Jan. 18, 1983, to Peterson et al. The debarking elements used in these prior patents are flexible throughout their length, and rely largely on centrifugal forces to press them against logs being debarked. Although these may be effective in removing bark, the rotational speed needed to gain enough energy to delimb would probably cause excessive wear on the flexible elements.

SUMMARY OF THE INVENTION

Generally, in the prior art, the profile of a roller or spool having fixed debarking elements is roughly constant as it rotates; this makes the roller essentially suitable for contacting only a log part which has a matching profile, so that the devices are not well adapted to scraping the bark off logs of widely varying diameters. In the present invention, a roller or spool is used having debarking elements which provide a profile which varies markedly as it rotates, at least when the spool is in operation and the debarking elements are hitting tree parts. This varying profile is provided by debarking elements which hold the log away from the remainder of the spool and which, seen from a fixed position, move progressively axially and radially of the spool as this rotates. Unlike in some of the prior art discussed above, debarking does not rely on pressure but on a scraping action by teeth on the debarking elements; for this reason the spools do not need to be almost opposite each other, and each spool can have side portions which project beyond the sides of the smaller logs. The debarking elements can be designed so that during one rotation they will contact almost all of the surface of one side of a log, and these elements may be capable of scraping the bark off 180° of the circumference of logs of widely different diameters. Accordingly, tree parts need only a single pass between two spools of this invention to do a satisfactory debarking for a pulp mill.

More specifically, in accordance with one aspect of the present invention, debarking/delimbing apparatus comprises at least one spool device mountable so as to be rotatably driven about an axis and capable of removing bark from tree parts moved lengthwise relative to the device across its axis, each spool device comprising a rotor carrying one or more pairs of symmetrically arranged, elongated debarking elements each having debarking teeth. Each of the symmetrically arranged debarking elements has a generally helical curvature which expands from a minimum diameter at a central region of the rotor, where adjacent debarking elements are close together, to a maximum diameter away from the central region where the adjacent elements are wider apart. The elements protrude from the rotor so that, in most angular positions of the rotor, a tree part is cradled between the debarking elements and contacts the spool only on one area of each debarking element of a pair.

The helical shape of the debarking elements is such that tree parts which vary in diameter by a ratio of 4:1, 6:1, 10:1 or more can all be contacted and debarked over 180° or close to 180° of their circumference by these elements. The debarking elements may be designed to debark tree parts from 1 or 2 inches diameter up to 12, 18, or 24 inches in diameter.

Preferably, the locus of the teeth of each debarking element moves, as the spool rotates, along a path which diverges from the central region of the rotor at an angle of the order of at least 45°, and preferably close to 45°, to the spool axis.

The debarking elements may be helically curved rods fixed to the rotor, and the debarking teeth may be serrations extending at an angle of the order of 45° to the rod axes, and occupying the outer face and at least one side of the element. The rods themselves extend at a steep pitch angle to the rotor axis, or, conversely stated the helical angle, i.e. the angle between the elements and a plane perpendicular to the axis, is relatively small, say less than 25°, and preferably less than 10°.

The rotor may carry a single pair of the debarking elements each extending about 360° around the axis of the rotor, or may carry two or three pairs which, in combination, extend 360° around the rotor. Accordingly, reference to such elements having a helical curvature will be understood not to imply that these elements necessarily form a complete 360° helix. Preferably, no single pair of debarking elements extends much more than 360° around the spool, and where several pairs of such elements are used, these are arranged so that in most rotational positions of the spool a log is only exposed to a single pair of the elements.

The debarking elements may be rigidly mounted on the rotor, so as to remain close to the desired helical orientation. However, I have found that there are advantages to having the debarking elements flexibly mounted, in which case they are capable of assuming a near helical form, but the precise orientation will depend on forces to which they are subjected.

The flexible mounting may include a bearing pivotable around shaft means extending parallel to the shaft axis, so that the elements can be deflected inwardly when they hit a tree part. This reduces the need for a spool to have a floating mounting, since it allows tree parts of different diameter to be accommodated even if the spool axis does not move. Resilient or cushioning means may be used to urge the debarking elements outwards to a preferred radial orientation, and reliance is not placed on centrifugal forces as in the prior art.

The flexible mounting may also be such that the inner end of each debarking element can pivot about an axis which is transverse to these shaft means; this allows an outer end portion of the element to move sideways when subjected to sideways forces, and helps to ensure that the elements press against the sides of the tree part. In this case, the elements can be biassed into a neutral position in which they lie in a plane perpendicular to that of the rotor. In this latter aspect of the invention the debarking elements are not helical in their unstressed condition, but are capable of assuming a near-helical form when subjected to side forces. This is of particular usefulness when it is desired to make a long spool which is capable of treating a large number of tree parts simultaneously, since as the tree parts are fed into the spool they will deflect the debarking elements to one side or the other, and the elements will assume a near-helical orientation suited to the particular material. The elements in this case will have debarking teeth on both sides as well as on the outer facing surfaces. As will be described below, the term "near helical" includes a rough approximation which is achievable by a debarking element which is curved but lies in a flat plane.

BRIEF DESCRIPTION OF THE DRAWINGS

The invention will now be further described with reference to the accompanying drawings, in which:

5

Figure 1:
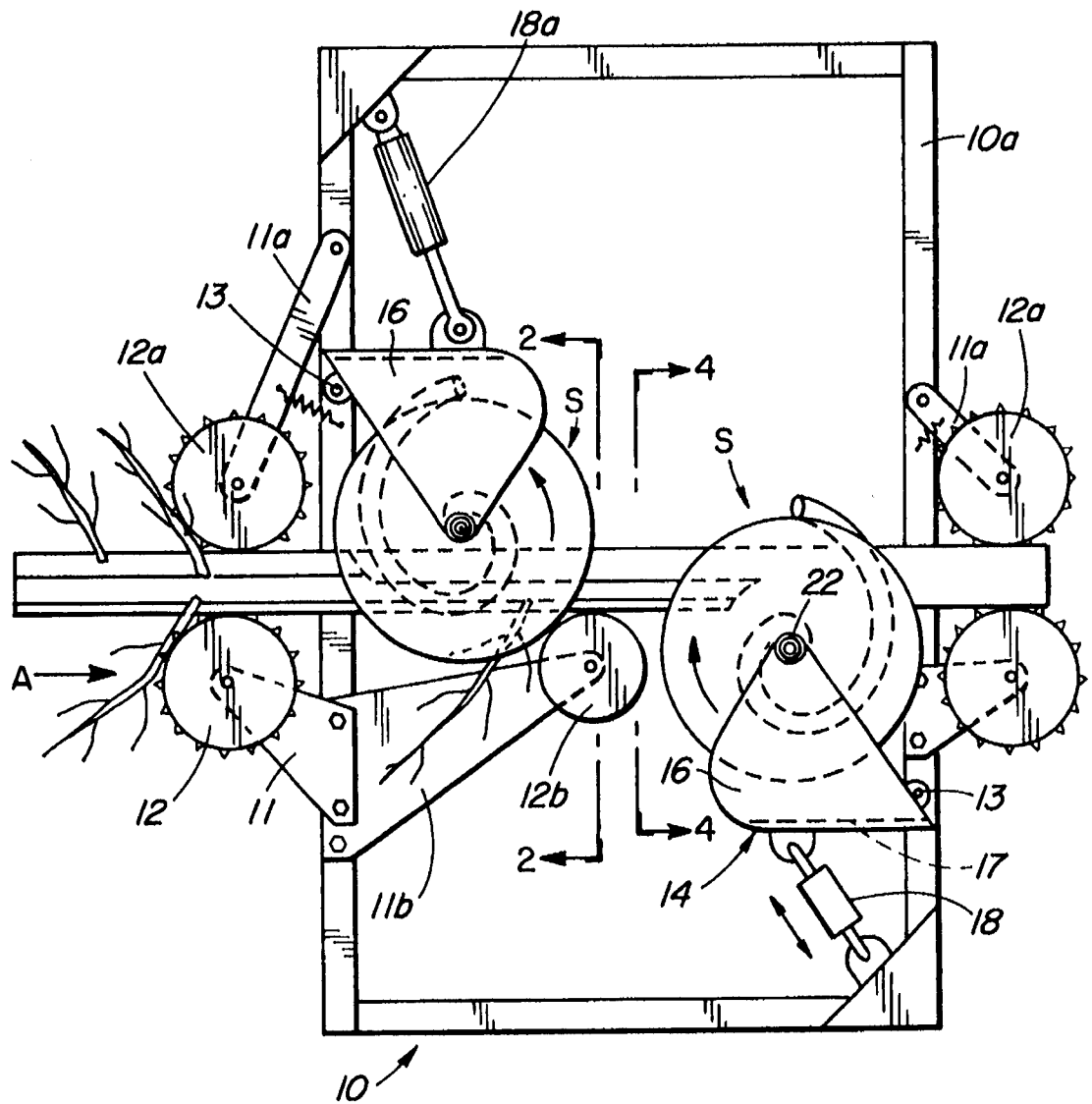
Figure 7:
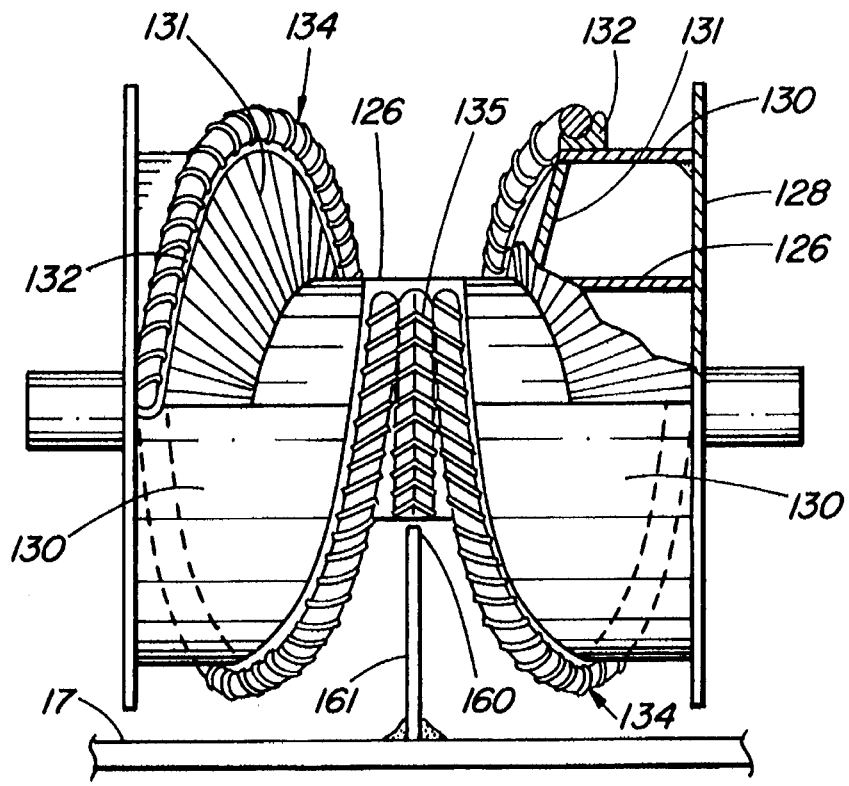
Figure 8:
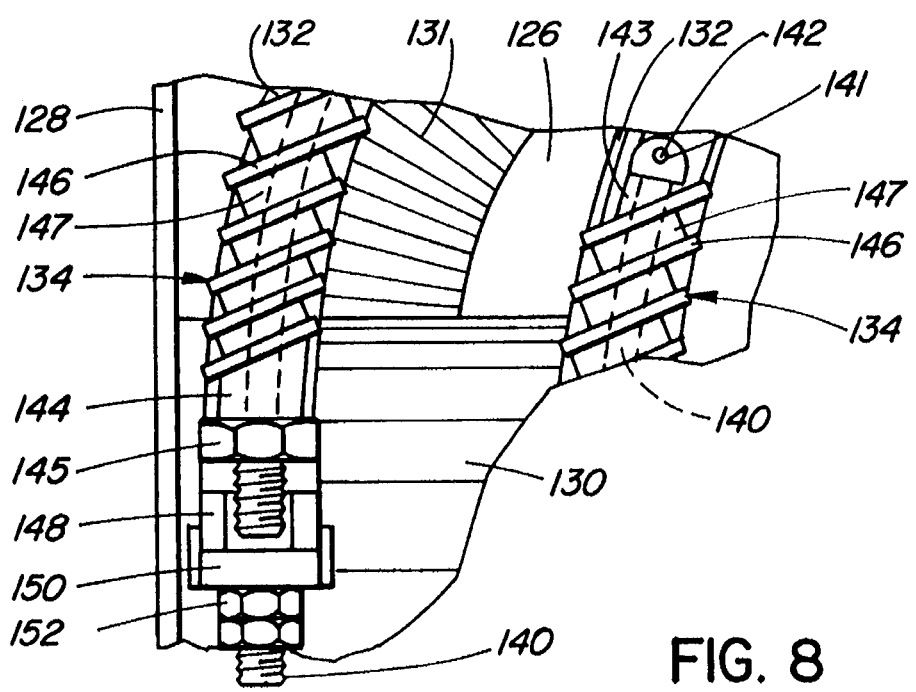
Figure 9:
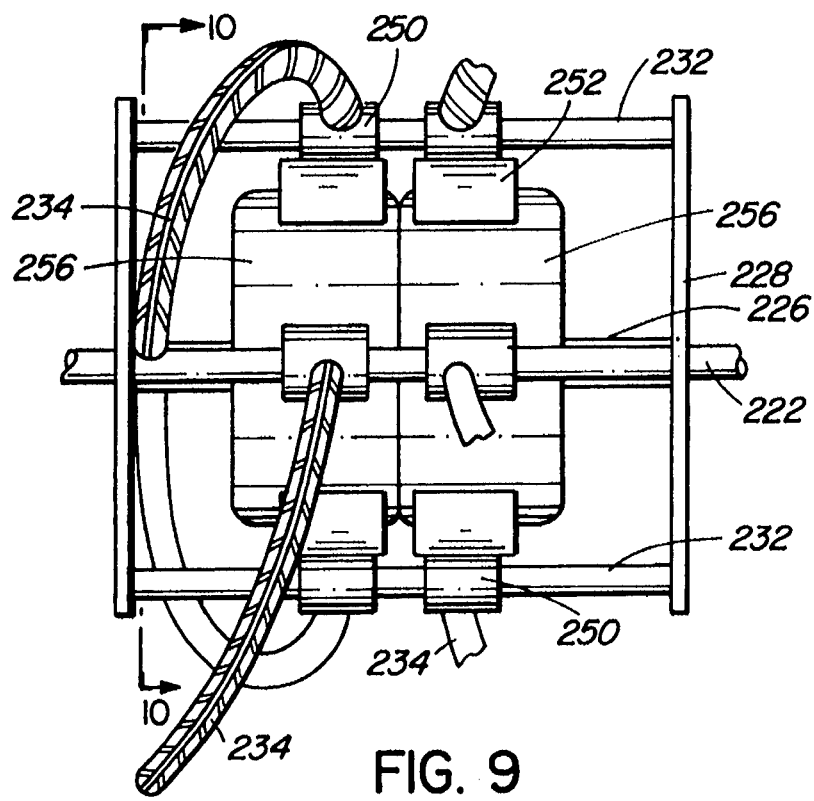
Figure 10:
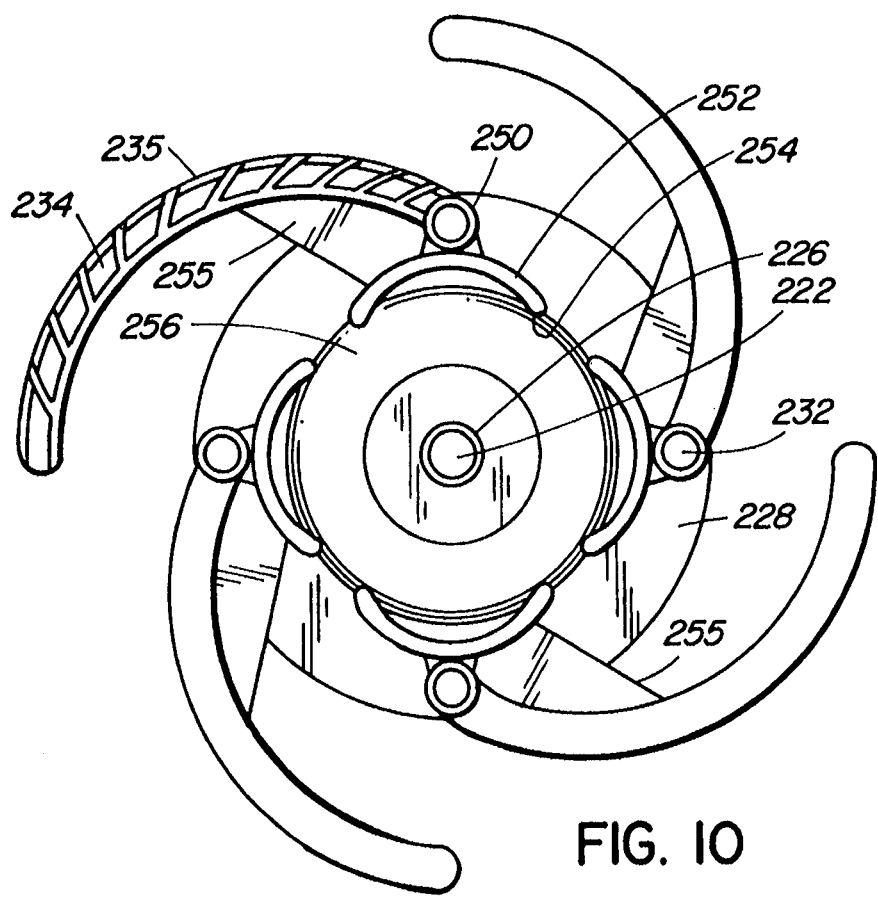
Figure 14:
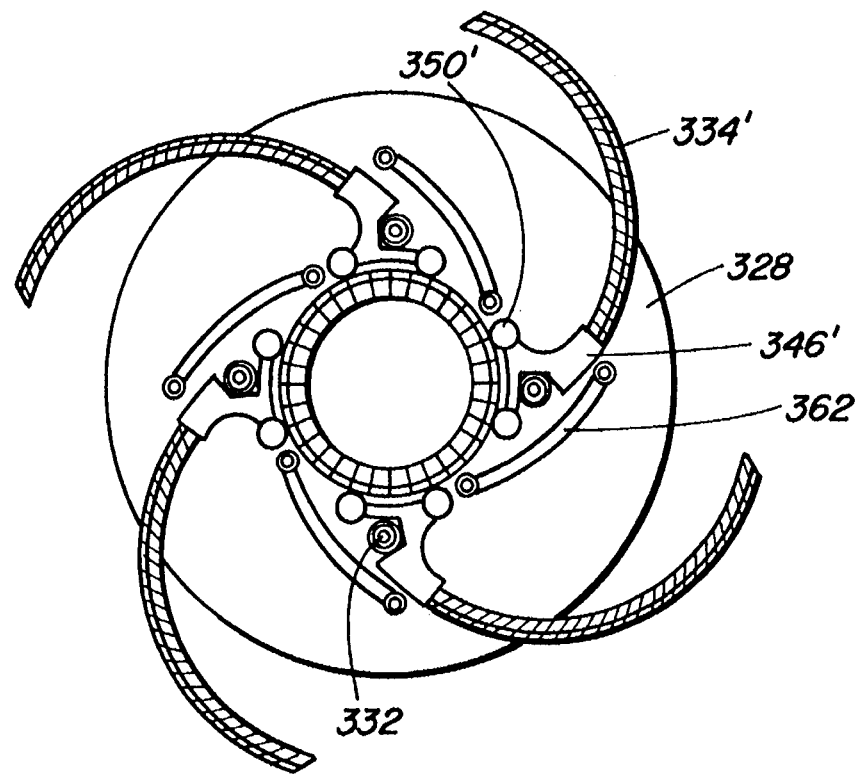
Figure 15:
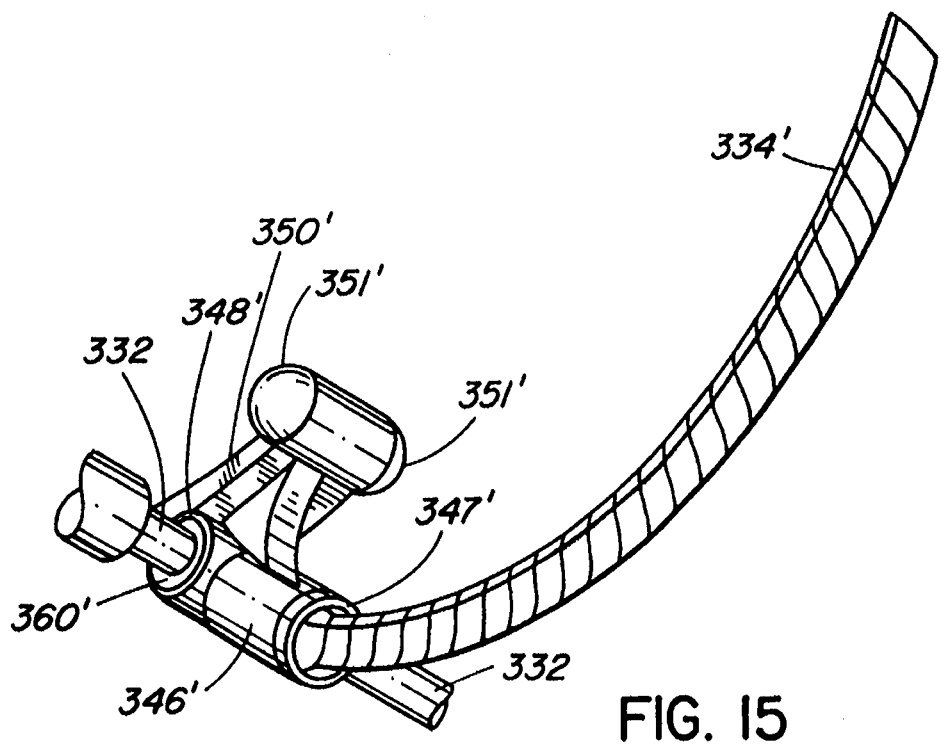

FIG. 1 shows a longitudinal section through debarking apparatus using a first embodiment of spool devices according to the invention;

FIG. 2 shows a front view of one of the spool devices taken on lines 2—2 of FIG. 1;

FIG. 3 shows, on an enlarged scale, a portion of a debarking element;

FIGS. 4a and 4b are diagrammatic views, taken on lines 4—4 of FIG. 1, showing how the debarking elements contact tree parts of different diameters as the spool rotates;

FIGS. 5a, 5b, and 5c are diagrammatic views of three spools in accordance with the invention, showing three different arrangements of debarking elements;

FIG. 6 is a view similar to FIG. 1 showing apparatus with spools of a modified form;

FIG. 7, which appears on the same drawing sheet as FIG. 5, is a view similar to FIG. 4a of the modified spool;

FIG. 8 is a diagrammatic fragmentary view of the central part of a spool similar to that of FIG. 7, but having a modified form of debarking element;

FIG. 9 is a view similar to FIG. 7 of a further embodiment;

FIG. 10 is a sectional view taken on lines 10—10 of FIG. 9;

FIG. 11 is a side view of a spool designed for treating a large number of small tree parts;

FIG. 12 is an enlarged view of a flexible mounting for a debarking element, taken on lines 12—12 of FIG. 11;

FIG. 13 is another enlarged view of the flexible mounting, taken on lines 13—13 of FIG. 12, FIG. 14 is an end view of a further modified spool; and FIG. 15 is a perspective view of a debarking element and its mounting, as used in the FIG. 14 embodiment.

DETAILED DESCRIPTION

FIG. 1 illustrates apparatus which incorporates two spools S of this invention, arranged to operate on a tree part in sequence, removing limbs and bark first from the top and then from the bottom of the tree part as this is fed between the spools by feeding rolls in the direction indicated by the arrow A. If the limbs are large, they can be removed by known delimbers as a preliminary step.

The apparatus shown has a frame 10 formed of steel members, including vertical members 10a having fixed mountings 11 for lower feed rollers 12 and having bearings for spring-biassed pivot arms 11a which carry movable upper feed rollers 12a. These feed rollers are grooved and are of generally known form capable of gripping a tree by bending inwardly the limbs, and they are driven to move the tree in the direction shown. A single roller 12b is provided to support the tree part between the two spools, this being carried by fixed arms 11b.

The vertical members also carry pivots 13 for two movable spool carrying brackets 14. Each of these brackets has two generally triangular side plates 16 connected by a web 17, corners of the side plates being mounted on pivots 12 and the web 17 being connected to an adjacent corner of the frame by air cylinders 18 and 18a; the latter, top, air cylinder being longer than the lower air cylinder because the upper spool has to move substantially to accommodate the wide range of tree diameters for which this apparatus is designed. For each bracket, a corner of the side plates 16 remote from the web provides bearings for a shaft 22 which supports the spool S. The air cylinders provide yieldable mountings for the spool shafts which can move along arcs centered on pivots 13. Since the apparatus does not need to apply much pressure to the tree parts, the spools can be spaced well apart in the axial direction of the tree part, so that portions of the spools may overlap the sides of the tree parts without interfering with each other.

As shown in FIGS. 2, each shaft is rotatably driven by a hydraulic motor 24 which is mounted on one of the side plates 16. The spool itself includes a sleeve 26 which is keyed to shaft 22, the ends of which sleeve are fixed to end disks 28, located just inside the side plates 16. These disks support the outer ends of hollow conical members 30, which diverge outwardly and symmetrically from the center of the sleeve 26 at angles of 45°. The members 30 each have fixed thereon a support bar 32 bent into an expanding helical curve and having a cylindrically concave recess extending along its outer surface, in which is fixed a rod-like debarking element 34.

The two debarking elements 34 are symmetrically arranged about the center of the spool and each has a helical, expanding curvature, starting at the center of the spool at a minimum diameter where the debarking elements are close together and preferably touching, and expanding to more than three times this diameter at the outer ends of the spool where the elements are spaced well apart to accommodate the largest diameter of tree to be processed. The elements lie at a relatively steep angle to the spool axis, or conversely at a relatively small helical angle "h" to the plane perpendicular to the axis, as shown in FIG. 2, this being less than 25° and preferably about 20°. As will be further seen with regard to FIGS. 4a and 4b, the bars 32 support the elements 34 sufficiently away from the surfaces 30 that tree parts are held clear of these surfaces, and contact only the debarking elements when the spool is being rotated at suitable speed.

A simple form for the debarking elements is shown in FIG. 3. Each element is in the form of a steel rod, 2 inches in diameter, and has teeth 35 in the form of a series of serrations upstanding about ¼ inch above its surface, and occupying both the outer surface of the rod and the inwardly facing side surface. These serrations are like the threads of a multi-start screw, and extend at an angle of 45° to the axis of the rod. The height of the serrations is chosen to provide adequate scraping action for debarking, without undue destruction or waste of wood, and the angle is chosen so that bark which has collected in the grooves between the serrations can continually be pushed out by newly removed bark during the process. A more complex form of debarking element is described below.

In operation, a tree trunk is delimbed and debarked by having its stump end inserted into the apparatus, as shown in FIG. 1, between the two spools S, while these are both driven by hydraulic motors 24 in the directions indicated, usually at a speed of around 200 or 300 r.p.m., the rotation of the spools assisting the feeding process. The feed rollers 12 are rotated so that their peripheral speed is much slower than that of the spools to control the movement of the logs through the apparatus and to ensure that these move at a speed which allows complete debarking.

The manner in which a spool device contacts a log is illustrated, firstly, in FIG. 4a. Here, in addition to showing the debarking elements at the position where both their ends can contact a log of suitable diameter, the positions that the debarking elements would occupy in three other rotational positions, all at 90° to each other, are also shown in broken lines. It will be apparent from this that the locus of the teeth of each debarking element lies on a straight line at an angle of 45° to the rotor axis.

FIG. 4a shows how a log of constant diameter is acted upon by the spool. The innermost ends of the debarking elements contact the log when this is in position L1, and begin removing bark from an area on the bottom of the log. As the spool rotates, the debarked area widens, and after the spool has rotated through 180° the log at position L2 is being cradled by portions 34' of the debarking elements which are removing bark at positions about 45° from the log center. After another 90° of rotation, the portions 34" of the elements are cradling the log at position L3 and removing bark at points near the lateral sides of the logs. Thus, a spool of this kind can progressively remove bark from one half of the log surface. It will be noted that, as the spool rotates, the distance between the spool axis and the log axis will vary; this is accommodated by movement of the spool brackets about their pivots 12 as permitted by air cylinders 18 and 18a.

A major use of this apparatus will be with tree parts or logs which vary greatly in diameter, and in fact all the trees normally treated will have a wide variation in trunk diameter. FIG. 4b shows how the spool acts on such logs of widely differing diameters. For example, a small log Ls can be debarked by its contact with the debarking elements in their first 180° of rotation, up to the portion 34'. A large log Lg is debarked by operation of the whole length of the debarking elements, over 360° of movement of the spool.

As shown in FIG. 5a, a spool may have a single pair of debarking elements extending 360° or a little more around the spool axis. FIG. 5b shows a spool with two pairs of debarking elements each extending 180° around the spool axis, while FIG. 5c shows three pairs each extending about 120°. From this it will be understood that reference to the debarking elements being in the form of a helix does not imply that any one debarking element need extend completely around the spool. It should also be noted that although in some positions of the spool, for example as shown in full lines in FIG. 4a and 4b, a log is exposed to two pairs of debarking elements (actually both ends of a single pair of the elements), nevertheless in most positions of the spool the log is exposed to only one pair of the elements.

FIG. 6 shows apparatus similar to that of FIG. 1 using a modified form of spool having two pairs of debarking elements 134. Details of this spool are shown in FIG. 7. It has a central sleeve 126 of large diameter, about 12 inches, this being large enough to accommodate a hydraulic motor having a stationary part fixed to the plate 16 of the supporting bracket. End plates 128 are welded to this sleeve and, in this embodiment, extend radially beyond the debarking elements. Welded to end plates 128 are curved supporting plates 130 each of which is spirally curved and has its axially inwardly facing edge cut in the shape of an expanding helical curve corresponding to the desired helical curve of the debarking elements. Welded to this edge is a support 132 along which extends a part-cylindrical recess suitable for carrying and locating one of the debarking elements 134. These debarking elements, and the inwardly facing edges of each plate 130, are also supported by radially extending plates 131 of spiral and helical form. In this embodiment, debarking teeth 135 are also provided on a narrow central area of the sleeve 126; however these are not needed if the inner ends of the debarking elements are brought close together.

In this embodiment, instead of being in the form of solid rods fixed in place, the debarking elements may be made with teeth which can be easily replaced when worn. One suitable construction is illustrated in FIG. 8, where parts of a debarking element 134 are shown held in a grooved support 132. As shown, element 134 comprises a central core 140 with an enlarged eye 141 at one end for securement to pin 142 projecting from support 132. Abutting the enlarged eye is a sleeve 143 having a rear face sloping at 45° to its axis. A similar sleeve 144 is located at the other end of the core by nut 145, and these sleeves between them hold in place a series of washer elements 146 alternated with spacers 147, which all have apertures fitting loosely enough on the core to lie at 45° to its axis, the parts all being held tightly together when nut 145 is tightened. Beyond the nut 145, the core is removably secured to the spool by being fitted through a bracket 148 which is welded to support 132. This bracket 148 has an open top, and an outer face which slopes downwardly, inwardly, to provide a recess which normally retains in place a complementarily shaped locking member 150 secured by nuts 152.

The washer elements 146 project at least ¼ inch beyond the spacers and the corners between their outer cylindrical surfaces and their faces are sufficiently sharp to act as debarking teeth. When these edges start to become worn, the washer elements can be rotated to expose fresh edges by loosening the nut 145. When thoroughly worn the washer elements can be replaced by loosening nuts 149 and subsequent removal of the core from the support through the open top of bracket 148.

It will be clear from this construction that the term "teeth" does not necessarily imply a pointed member, and a sharp 90° corner is sufficient.

Alternatively, special tooth elements may be made having a bore for fitting on the core, and teeth inclined at a suitable angle, also designed to be rotatable to expose fresh tooth faces, and to be readily replaceable when worn.

Another feature of this embodiment is the provision of a cleaning tooth 160 provided by the outer corner of a triangular plate 161 situated parallel to and midway between the bracket plates 16, and supported by web 17 of the brackets 14. This is effective to clean debris from between the debarking elements as the spool rotates.

Debarking apparatus constructed with spools as described is relatively inexpensive, compared to ring debarkers, and can be made suitable for debarking and delimbing tree parts having diameters which vary greatly, for example from 24 inches down to 1 inch in diameter, i.e. a diameter ratio of more than 20:1. For 12 inch diameter logs the maximum radius of the debarking elements should exceed the minimum radius by 6 inches or more, and for 18 inch logs by 9 inches or more. The apparatus can be made portable, for use in the forest.

FIGS. 9 and 10 show the first of three embodiments of the invention in which the debarking elements are flexibly mounted. As shown, the spool comprises two end plates 228, connected by a sleeve 226 rotatable on a shaft 222. The plates 228 are also connected by four shafts 232, on which are pivoted journal bearings 250 carrying the inner ends of the debarking elements 234. These elements are curved roughly as an arc of a circle, as seen in side view in FIG. 10, and may also be helically curved, i.e. twisted so as not quite to lie in a single plane. To the inner side of each of the bearings 250 is welded a base part 252 comprising a plate having inwardly curved, rounded feet 254, and connected to the debarking element by a gusset plate 255. These feet 254 are in firm contact with a pneumatic tire 256 carried by a wheel the hub of which is mounted on the sleeve 226. The tires may be relatively small but wide tires, such as 18 inch diameter lawn tractor tires, mounted on lawn tractor wheels, although of course for this application a tires without tread could be used. One tire is used for each set of four longitudinally aligned debarking elements, the tires being close together and in contact with each other.

It will be evident that the interaction of the feet 254, acting against the outside of the tire 256, provides cushioned support for the associated debarking element 234 which can be deflected inwardly when it hits a tree part, with the rearmost foot 254 being pressed into the tire, and provides a restoring force tending to return the element to its unstressed position in which it is helically orientated, as in earlier embodiments, or at least nearly so. The amount of restoring force can readily be adjusted, dependent on the trees being processed, by altering the pressure in the tires. This flexible mounting of the elements reduces the need for the upper spool to be floating, and reduces its up and down motion if it is made floating.

FIGS. 11 to 13 show a further embodiment with flexibly mounted debarking elements, but in this case the elements are flexibly mounted not only for inwards deflection, but also for sideways deflection. This embodiment is particularly designed to treat several tree parts at a time, these being fed into the apparatus side-by-side.

As shown in FIG. 11, the spool is axially elongated to accommodate the side-by-side tree parts, and has central sleeve 326 supporting two end discs 328 which hold four equally spaced shafts 332 each parallel to the central axis. Each shaft 332 supports a series of six debarking elements 334, the elements on each shaft being equally spaced and the elements of the successive shafts being staggered so that, if the spacing between elements of each shaft is "d" (as indicated in FIG. 11), then each element is off-set ¼d from elements of the adjacent shafts. Each element is connected to the associated shaft by a flexible mounting as shown in FIGS. 12 and 13; furthermore, in this embodiment, each element 334 is made to be easily replaceable.

As shown in FIGS. 12 and 13, each element 334 has an inner end portion removably held by a support 346 which is in the form of a curved U-shaped channel part, having pins 347 for securing it to the element. The pins can be removed if it is necessary to change a worn element. The inner end of support 346 is welded to a collar 348, to the fore and aft sides of which are welded cross plates 350 which extend outwards from opposite sides of the base of the collar and form a base for contact with cushioning means provided by a tire 356, as in the previous embodiment. A series of such tires is used side by side along the spool, as shown in FIG. 11. To give smooth contact between the base and the tire, the corners of the base, which are situated as corners of a rectangle and are disposed on opposite sides of the inner end of the debarking element both in a direction circumferential to the spool and longitudinally of the spool, are provided with welded on steel balls 351 which provide rounded feet. Conceivably, a base having only three feet could be used.

The plates 350 are connected by small gussets 352 to the sides of guideways 354 situated on opposite sides of the collar 348, these guideways having straight sides slidably engaging the sides of shaft 332. The collar 348 engages shaft 332 via a part spherical bearing 360. This bearing would normally allow limited universal movement of the debarking element relative to the shaft, but here the movement is restricted by the guideways 354 so that the support 346 and the element 334 can tilt about an axis which is circumferential to the mounting, but is prevented from twisting about an axis that is radial to the mounting. The tilting movement allows the element to assume a near helical orientation when pushed sideways by striking the side of a tree part. Accordingly, a series of tree parts may be fed simultaneously into the spool, and the debarking members will be deflected suitably to remove bark from one face and two sides of the tree parts.

FIG. 13 also shows a curved guard plate 362, omitted from the other drawings for clarity; this is a plate which extends in front of and parallel to each of the shafts 332 and is positioned to protect the mounting of the debarking element from damage.

FIGS. 12 and 13 also show a further design of debarking teeth which may be used on the elements 334, and on the elements of previous embodiments. As shown, the elements have teeth 335 in the form of ribs of between ⅛ and 1/16 of an inch in height, which slope forwardly from the rear inner surface of the element to the outer surface, where they meet a central longitudinal rib or keel 335'. This central keel is useful for impacting and breaking the branches of trees. Suitable keel construction may be found in certain kinds of steel rods for concrete reinforcing or so-called "re-bar", and rod of this kind of 1 ½ inch diameter has been found quite suitable for use with this invention. It is of course important with this embodiment that the teeth should occupy both sides, as well as the outer face, of the debarking element.

It will be appreciated that since each debarking element is substantially rigid, and, in the unstressed condition, lies in a flat plane perpendicular to the spool axis, it cannot assume a truly helical orientation, which would require the use of an element twisted out of a single plane. In this embodiment, therefore, the term "near helical" orientation and like terms include the orientation assumed by a flat curved element when pivoted about an axis through the mounting which is circumferential to the spool; this pivoting axis being used because it is subject to a restoring force applied by the tire. The embodiment shown in FIGS. 14 and 15 uses a different kind of flexible mounting, which is not subject to this restriction.

In FIGS. 14 and 15, parts which are the same as those in the previous embodiment are similarly referenced. Here, each debarking element 334' has an enlarged inner end held by a socket 346', and is secured in this socket by a collar 347', threadedly engaging the socket. This allows replacement of a worn element. The socket is fixed to a journal bearing 348', rotatably mounted on shaft 332, and this bearing 348' contains a resilient bushing 360', which allows a small amount of pivoting of the element 334' about any axis transverse to the shaft 332. Since the restoring force for these sideways movements of the element depends on the resilient bushing rather than on interaction with the tire, the latter is only needed to control pivoting motion of the mounting about the shaft 332, and feet 350' can be short in the lateral direction.

In the last two embodiments, the debarking elements themselves are rigid relative to the flexibility provided by their mountings. Conceivably, a closer approximation to helical orientation could be achieved with these embodiments if the debarking elements were made somewhat flexible at least in the sideways direction. However, they will still be relatively rigid compared to those prior art designs which rely on centrifugal forces to bring the elements into contact with the wood.

We claim:

1. Debarking/delimbing apparatus comprising at least one spool device mountable so as to be rotatably driven about an axis and capable of removing bark from tree parts moved lengthwise relative to said device across said axis;

each spool device comprising a rotor carrying one or more pairs of symmetrically arranged, elongated debarking elements each having debarking teeth, each of said symmetrically arranged debarking elements being in the form of a helix expanding from a minimum diameter at a central region where the debarking elements are close together, to a maximum diameter away from said central region where the elements are spaced apart, said elements protruding from the rotor so that, in most angular positions of the rotor, a tree part may be cradled between the debarking elements and can contact the spool only on one area of each debarking element of a pair.

2. Apparatus according to claim 1, wherein each pair of debarking elements extends not much more than 360° around the spool, and wherein, in most positions of the spool, a log is exposed to only two of said debarking elements.

3. Apparatus according to claim 1, wherein the maximum radius of the debarking elements exceeds the minimum radius by 6 inches or more.

4. Apparatus according to claim 1, wherein the debarking elements lie at a helix angle of less than b 25°.

5. Apparatus according to claim 1, wherein the locus of the teeth of each pair of debarking elements moves, as the spool device rotates, along a path which diverges from the central region of the rotor an angle of at least 45° to the rotor axis.

6. Apparatus according to claim 1, wherein the debarking elements are helically curved rods, these rods having transverse debarking teeth in the form of serrations extending at an angle of the order of 45° to the axis of the respective rod and occupying the outside of and at least one side of each debarking element.

7. Apparatus according to claim 6, wherein said rods each comprise a series of segments mounted on a generally helical core, said segments effectively providing debarking teeth on several sides and being adjustable in rotational position on said core to selectively expose said sides.

8. Apparatus according to claim 1, wherein said rotor carries two pairs of said debarking elements having inner ends spaced 180° around the axis of the rotor and each extending slightly more than 180° around the axis of the rotor.

9. Apparatus according to claim 1, wherein said rotor carries three pairs of debarking elements having inner ends spaced 120° around the axis of the rotor and each extending about 120° around the axis of the rotor.

10. Debarking apparatus according to claim 1, comprising two of said spool devices mounted parallel to each other and spaced apart so that a tree part can pass therebetween, the spool devices having drive means and being spaced so that they cannot interfere with each other irrespective of movements occurring in said mountings, and wherein feed roller means are provided for axially moving tree parts between the two devices substantially perpendicularly to their axes so that opposite sides of each tree part are acted upon by the two devices, drive means being provided for rotating said feed rollers at a peripheral speed which is slow relative to the peripheral speed of the spool devices so that the tree parts are substantially fully debarked on passing through the apparatus.

11. Debarking/delimbing apparatus comprising at least one spool device mountable so as to be rotatably driven about an axis and capable of removing bark from tree parts moved lengthwise relative to said device across said axis;

each spool device comprising a rotor carrying one or more pairs of elongated debarking elements each having debarking teeth spaced along its length, said teeth being disposed both on an outer face of each element and at least on one side;

each of said debarking elements being mounted and curved in such manner that in operation said elements are of near helical form and expand from a minimum diameter at a region where adjacent debarking elements are close together to a maximum diameter away from said region where said adjacent elements are spaced further apart than at said region, said elements protruding from the rotor so that, in most angular positions of the rotor, a tree part may be cradled between said adjacent debarking elements.

12. Apparatus according to claim 11, wherein said elements are connected to the rotor by flexible mountings which allow the elements to assume variable orientation dependent on sideways forces applied by tree parts to the elements, said mountings including resilient or cushioning means to urge the elements towards a preferred orientation.

13. Apparatus according to claim 12, wherein said elements are biassed towards a helical angle of less than 10°.

14. Apparatus according to claim 12, wherein several pairs of debarking elements are provided, the elements being evenly spaced apart along the rotor, and the elements are biassed towards a helical angle of 0°.

15. Apparatus according to claim 12, wherein said flexible mountings include several shaft means extending longitudinally of the spool and spaced from and parallel to said axis, joint means mounting each said element on said shaft means, which joint means allow pivotal movement of the debarking elements about the axis of said shaft means, a base fixed to an inner end of each element radially inwardly of said shaft means, and pressurised pneumatic cushioning means interacting with said base means to bias said element towards a predetermined orientation.

16. Apparatus according to claim 15, wherein said joint means also allows pivoting of said elements about an axis transverse to said shaft means, whereby the helical angle of the elements may be changed by sideways forces on said elements.

17. Apparatus according to claim 16, wherein the joint between the shaft means and the debarking element resists pivotal movement of the debarking element about an axis radial to the spool.

18. Debarking/delimbing apparatus comprising at least one spool device mountable so as to be rotatably driven about an axis and capable of removing bark from tree parts moved lengthwise relative to said device across said axis;

each spool device comprising a rotor carrying a plurality of debarking elements each having debarking teeth spaced along its length and on at least one side, each of said debarking elements being in the form of a member having a convexly curved outer surface and having its inner end connected to the rotor by a flexible mounting including shaft means extending longitudinally of the spool and spaced from and parallel to said axis, said mounting including joint means mounting said element on said shaft means, said joint means allowing for pivotal movement of the element about the axis of the shaft means and about an axis which is transverse to said shaft means;

said joint means further comprising biassing means tending to urge each of the elements into a plane transverse to the spool and into a predetermined radial orientation relative to the spool.

19. Apparatus according to claim 18, wherein said joint means includes a part spherical bearing allowing for limited universal movement of the element relative to the shaft means, and guideways restricting said movement to pivotal movement about the shaft means and tilting movement about an axis generally circumferential to the shaft means.

20. Apparatus according to claim 19, wherein said joint means includes a base part fixed to an inner end of each element radially inwardly of the shaft means, and pressurized cushioning means interacting with said base part to bias said element into a plane transverse to the spool.

21. Apparatus according to claim 20, wherein said rotor carries at least four debarking elements equally spaced along its length.

22. Apparatus according to claim 18, wherein the debarking elements are curved rods, these rods having transverse debarking teeth in the form of serrations extending at an angle of the order of 45° to the axis of the respective rod and occupying the outside of and both sides of each debarking element, and having a central keel extending along the outer surface of each rod.

23. Apparatus according to claim 18, wherein said joint means includes a resilient bushing connecting each debarking element to the shaft means.

* * * * *